United States Patent
Marzetta

(10) Patent No.: US 7,508,808 B2
(45) Date of Patent: Mar. 24, 2009

(54) FREQUENCY-DIVISION MULTIPLEXING SYSTEM AND METHOD FOR COMMUNICATION HAVING ENHANCED RELIABILITY IN FADING ENVIRONMENTS

(75) Inventor: Thomas L. Marzetta, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 891 days.

(21) Appl. No.: 10/438,086

(22) Filed: May 14, 2003

(65) Prior Publication Data

US 2004/0228271 A1 Nov. 18, 2004

(51) Int. Cl.
*H04J 1/00* (2006.01)
*H04K 1/10* (2006.01)
*H04L 27/28* (2006.01)

(52) U.S. Cl. ...................... 370/343; 375/260

(58) Field of Classification Search ................. 370/208, 370/210, 319, 330, 344, 478, 480, 343; 455/13.3, 455/42, 101; 375/244, 261, 267, 283, 260
See application file for complete search history.

(56) References Cited

U.S. PATENT DOCUMENTS

| | | | |
|---|---|---|---|
| 5,636,247 A * | 6/1997 | Kamerman et al. | 375/260 |
| 6,363,121 B1 | 3/2002 | Hochwald et al. | |
| 6,522,700 B1 | 2/2003 | Zimmermann et al. | |
| 6,594,320 B1 * | 7/2003 | Sayeed | 375/281 |
| 6,940,893 B1 * | 9/2005 | Pinkney et al. | 375/139 |
| 2002/0034214 A1 | 3/2002 | Okada et al. | |
| 2003/0035491 A1 | 2/2003 | Walton et al. | |
| 2003/0095533 A1 * | 5/2003 | Joo et al. | 370/343 |
| 2004/0151255 A1 * | 8/2004 | Riazi et al. | 375/260 |

FOREIGN PATENT DOCUMENTS

WO    WO 99/55030    10/1999

OTHER PUBLICATIONS

Hassibi et al., Cayley Differential Unitary Space-Time Codes, Jun. 2002, IEEE Transactions On Information Theory, vol. 48, No. 6, p. 1485-1503.*
Cayley Differential Unitary Space-Time Codes, IEEE Transactions on Information Theory, vol. 48, No. 6, Jun. 2002.*
U.S. Appl. No. 09/356,387, filed Jul. 16, 1999 entitled "Method for Wireless Differential Communication Using Multiple Transmitter Antennas".
"Layered Space-Time Architecture for Wireless Communication in a Fading Environment When Using Multi-Element Antennas" by Gerard J. Foschini, Bell Labs. Tech. J., vol. 1, No. 2, pp. 41-59, 1996.

(Continued)

*Primary Examiner*—Kevin C Harper
*Assistant Examiner*—Leon Andrews

(57) ABSTRACT

Frequency-division multiplexing and demultiplexing systems and methods for use with M transmit and N receive antennas, M equaling at least two. In one embodiment, a frequency-division multiplexing system includes: (1) a differential modulator that generates M×M unitary space-frequency signals from incoming message bits and (2) a time-frequency transformer, coupled to the differential modulator, that transforms the M×M space-frequency signals into space-time transmit signals for the M transmit antennas.

24 Claims, 2 Drawing Sheets

OTHER PUBLICATIONS

"Blast Training: Estimating Channel Characteristics for High Capacity Space-Time Wireless" by Thomas L. Marzetta; Proc. 37th Annual Allerton Conference on Communications, Control and Computing; pp. 958-966; Monticello, Illinois; Sep. 22-24, 1999.

"Differential Space-Time Modulation" by Brian L. Hughes; IEEE Trans. Commun.; vol. 46, No. 7; pp. 2567-2578; Nov. 2000.

"Differential Unitary Space-Time Modulation" by Bertrand M. Hochwald; IEEE Trans. Commun.; vol. 48, No. 12, pp. 2041-2052; Dec. 2000.

* cited by examiner

FREQUENCY-DIVISION MULTIPLEXING SYSTEM AND METHOD FOR COMMUNICATION HAVING ENHANCED RELIABILITY IN FADING ENVIRONMENTS

TECHNICAL FIELD OF THE INVENTION

The present invention is directed, in general, to radio frequency communication systems and, more specifically, to a frequency-division multiplexing system and method of communication having enhanced reliability in fading environments.

BACKGROUND OF THE INVENTION

Multiple-antenna wireless, also known as MIMO (multiple-input, multiple-output), remains an exciting area of communications research. MIMO promises the potential of orders-of-magnitude improvement in throughput compared with single-antenna links, without requiring extra power or physical bandwidth (see, e.g., Foschini, "Layered Space-Time Architecture for Wireless Communication in a Fading Environment when Using Multi-Element Antennas," Bell Labs. Tech. J., vol. 1, no. 2, pp. 41-59, 1996, incorporated herein by reference, and, Telatar, "Capacity of Multi-Antenna Gaussian Channels," European Transactions on Telecommunications, Vol. 10, No. 6, November 1999, incorporated herein in its entirety).

Bell Laboratories Layered Space-Time, or BLAST (see, Foschini, et al., supra) was the first practical scheme for realizing large throughputs with multiple antennas. BLAST assumes that the propagation matrix, the matrix-valued transfer function that couples the transmit array to the receive array, is constant with respect to frequency over the bandwidth of the transmitted signals (a condition known as "flat-fading"), and constant over relatively long intervals of time (the "coherence interval") as well. The condition can usually be guaranteed by using a sufficiently narrow bandwidth. For a general discussion of fading, see Biglieri, et al., "Fading Channels: Information-Theoretic and Communications Aspects," IEEE Trans. Info. Theory, vol. 44, no. 6, pp. 2619-2992, October 1998, incorporated herein by reference in its entirety.

The receiver estimates the propagation matrix from known training signals sent by the transmitter. The propagation matrix is then used to perform BLAST decoding. For many scenarios, the training interval occupies a negligible fraction of the coherence interval (see, Marzetta, "BLAST Training: Estimating Channel Characteristics for High-Capacity Space-Time Wireless," Proc. 37th Annual Allerton Conference on Communications, Control, and Computing, pp. 958-966, Monticello, Ill. , Sep. 22-24, 1999, incorporated herein by reference). However, fast-changing mobile environments can exceed the limits of training-based schemes with large numbers of transmit antennas.

This motivated the development of unitary space-time modulation (USTM) (see, Hochwald, et al., "Unitary Space-Time Modulation for Multiple-Antenna Communications in Rayleigh Flat Fading," IEEE Trans. Info. Theory, vol. 46, no. 2, incorporated herein in its entirety, and, U.S. Pat. No. 6,363, 121, issued on Mar. 26, 2002, and entitled "Wireless Transmission Method for Antenna Arrays Using Unitary Space-Time Signals," incorporated herein by reference) which dispenses entirely with training.

In lieu of training, message bits are encoded onto a L×M unitary matrix that is transmitted over L consecutive symbols, with M equal to the number of transmit antennas and L≧2M. A noncoherent receiver that requires no knowledge of the propagation matrix, and that only assumes that the propagation matrix is constant over the L symbols, performs the decoding.

Differential unitary space-time modulation (see, Hughes, "Differential Space-Time Modulation," IEEE Trans. Info. Theory, vol. 46, no. 7, pp. 2567-2578, November 2000, Hochwald, et al., "Differential Unitary Space-Time Modulation," IEEE Trans. Commun., vol. 48, no. 12, pp. 2041-2052, December 2000, and U.S. patent application Ser. No. 09/356, 387 filed Jul. 16, 1999, entitled "Method for Wireless Differential Communication Using Multiple Transmitter Antennas," all incorporated herein by reference, and, Marzetta, supra) is a special case where L=2M and where the matrix-valued signals have a particular structure such that the last L/2 symbols of a signal are identical to the first L/2 symbols of the next signal. Only the nonredundant part of the signal has to be transmitted, so in effect each L×M unitary matrix occupies only L/2 symbols, which tends to offset the 50% redundancy of the structured L×M signal. Differential Unitary Space-Time Modulation generates a sequence of M×M unitary transmitted signals, $\{S_0, S_1, \ldots \}$, where $S_0=I$ (the M×M identity matrix), and $S_k=A_k S_{\{k-1\}}$, k=1, 2, . . . , where $\{A_1, A_2, \ldots \}$ is a sequence of M×M unitary matrices that are obtained from the message bits.

As with USTM, a noncoherent receiver performs the decoding under the assumption that the propagation matrix is constant over L consecutive symbols. Decoding of the $k^{th}$ signal is based on the $k^{th}$ and the $(k-1)^{th}$ received signals, which (excluding noise) are equal to $A_k S_{\{k-1\}}$ H and $S_{\{k-1\}}$ H respectively, where H is the unknown M×N propagation matrix. The product $S_{\{k-1\}}$ H is assumed unknown, but the combination of the two measurements and the internal structure of the unitary matrix $A_k$ permits decoding.

At present, techniques for designing constellations of differential USTM signals and efficient decoding algorithms are more developed than for the more general nondifferential USTM (see, Hochwald, et al., "Cayley Differential Unitary Space-Time Codes," submitted to IEEE Trans. Info. Theory, February 2001, incorporated herein by reference in its entirety) though recent progress in nondifferential techniques has been reported (see, Hassibi, et al., "Unitary Space-Time Modulation via the Cayley Transform," Proceeding 2002 IEEE International Symposium on Information Theory, Lausanne, Switzerland, Jun. 30-Jul. 5, 2002, incorporated herein by reference in its entirety).

Cayley modulation is based on the Cayley representation for the unitary matrix $A_k=(I-i Q_k) (I+i Q_k)^{-1}$, where I is the M×M identity matrix, and $Q_k$ is an M×M conjugate symmetric matrix. In turn, $Q_k$ is a linear combination of M×M conjugate symmetric basis matrices, where the scalar weights depend on the message bits. Like BLAST, both USTM and differential USTM assume a condition of flat-fading.

Higher bandwidths, such as the 5 MHz used in Third Generation (3G) wireless, usually invalidate the flat-fading assumption, leaving receivers to deal with an unknown propagation matrix that is a function of frequency. Accordingly, what is needed in the art is still further improvement in MIMO modulation techniques. More specifically, what is needed is a MIMO modulation technique that dispenses with the need for a flat-fading assumption and therefore accommodate higher bandwidths in fading environments.

SUMMARY OF THE INVENTION

One straightforward way to deal with the frequency-dependent propagation matrix is to divide the channel into a multiplicity of subchannels that occupy nonoverlapping intervals of frequency and have a sufficiently narrow bandwidth so that individually each subchannel satisfies the flat-fading condition.

The technique of orthogonal frequency division multiplexing, or OFDM (see, e.g., Van Nee, et al., "OFDM for Wireless Multimedia Communications," Artech House, 2000, incorporated herein by reference in its entirety), is particularly efficient in this respect. With OFDM, one could then apply BLAST, USTM, or differential USTM independently to each of the subchannels over time. However, a significant disadvantage of this approach is that an independent treatment of the subchannels fails to exploit the typically high correlation between the propagation matrices of adjacent subchannels.

To address the above-discussed deficiencies, the present invention provides, frequency-division multiplexing and demultiplexing systems and methods for use with M transmit and N receive antennas, M equaling at least two. In one embodiment, the frequency-division multiplexing system includes: (1) a differential modulator that generates M×M unitary space-frequency signals from incoming message bits and (2) a time-frequency transformer, coupled to the differential modulator, that transforms the M×M unitary space-frequency signals into space-time transmit signals for the M transmit antennas.

The present invention therefore introduces a new modulation technique that uses multiple antennas in a delay-spread time-varying channel to combine differential USTM with OFDM, such that the differential action takes place over frequency rather than over time. The new multiple-antenna space-time modulation may be termed "differential unitary space-frequency modulation," or DUSFM, and can provide high throughput in rapidly varying, delay-spread (e.g., frequency-dependent) channels without the use of either training sequences or an equalizer. Within a short coherence symbol interval (which may be a 100 μsec duration), OFDM tools—the cyclic prefix and the FFT—produce an equivalent space-frequency channel. DUSTM, designed for a time-varying channel, can be "turned around" to operate over frequency rather than over time. DUSFM accommodate a frequency dependent channel, and requires only local frequency coherence.

In a more specific embodiment to be illustrated and described, the differential modulator is a differential OFDM modulator and, still more specifically, a differential Cayley modulator. In another specific embodiment, the time-frequency transformer applies an Inverse Fast Fourier Transform to the M×M unitary space-frequency signals, and in keeping with OFDM, the space-time transmit signals include a guard interval.

Another aspect of the present provides a frequency-division demultiplexing system. The demultiplexing system includes: (1) a time-frequency transformer that transforms space-time receive signals from the N receiving antennas into M×N space-frequency signals and (2) a differential demodulator, coupled to the time-frequency transformer, that generates outgoing message bits from the M×N space-frequency signals. Multiplexing and demultiplexing methods will also be illustrated and described in detail.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
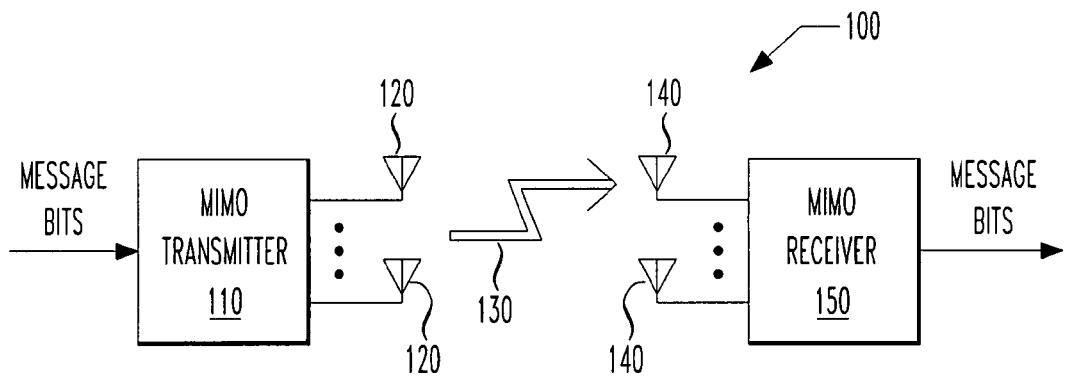
FIG. 1 illustrates a MIMO communication system that incorporates a system or method constructed or carried out according to the principles of the present invention.

Referring initially to FIG. 1, illustrated is a MIMO communication system, generally designated 100, that incorporates a system or method constructed or carried out according to the principles of the present invention. Throughout the discussion, complex baseband notation for the signals is employed.

The MIMO communication system 100 includes a MIMO transmitter 110 having a transmit array of M antennas 120. The MIMO transmitter 110 receives incoming message bits (not referenced) to be transmitted and processes the signals such that they are modulated and encoded into a stream of symbols. The MIMO transmitter then passes the stream of symbols to the transmit array of M antennas 120, where they are converted into wireless substreams (not separately referenced) of a MIMO channel 130. The M signals are fed to the M antennas simultaneously. M, the number of antennas 120 in the transmit array, is selected as a matter of design choice.

Those skilled in the pertinent art understand the many advantages of MIMO, many of which have been described in the Background of the Invention section above. Data can be transmitted at a higher rate for the same expenditure of power and bandwidth. The present invention enhances this advantage by providing a MIMO modulation technique which is more robust in frequency-dependent, rapidly-changing fading environments, wherein the wireless substreams are subjected to multipath interference and other forms of degradation.

Returning to FIG. 1, the MIMO communication system 100 further includes a MIMO receiver 150 having a receive array of N antennas 140. The receive array of N antennas 140 receives the wireless substreams of the MIMO channel 130, converting them into a stream of received symbols where typically every receive antenna receives a linear combination of all M transmitted signals. The MIMO receiver 150 then demodulates and decodes the received symbols into outgoing message bits that, if all is working properly, approximate if not exactly match the incoming message bits that the MIMO transmitter 110 originally received. N, the number of antennas 140 in the receive array, is, like M, selected as a matter of design choice.

Before delving into further detail with respect to systems or methods for multiplexing or demultiplexing, a signal model underlying the system or method will be described in detail. A single user uses a wireless link comprising M transmit antennas and N receive antennas. In general, the M×N propagation matrix that connects the two arrays has nontrivial frequency dependence that varies slowly with time.

Let $\bar{t}$ denote continuous time (seconds). At time $\bar{t}$, the 1×M complex-valued baseband signal that is fed to the transmit array is $s(\bar{t})$, and the 1×N complex-valued baseband signal that is measured at the receive array is $x(\bar{t})$. The assumption of a linearity implies that the action of the channel is equivalent to a superposition integral:

$$x(\bar{t}) = \int d\bar{\tau} s(\bar{\tau}) H(\bar{t},\bar{t}-\bar{\tau}) + w(\bar{t}) \qquad (1)$$

where $H(\bar{t},\bar{t}-\bar{\tau})$ is the M×N complex-valued matrix channel response at time $\bar{t}$ due to an impulse applied at time $\bar{t}-\bar{\tau}$, and $w(\bar{t})$ is white receiver noise. It is instructive to review three special cases.

(1) Flat-fading, time-invariant channel. Here, $H(\bar{t},\bar{t}-\bar{\tau}) = H\delta(\bar{t}-\bar{\tau})$, implying that $x(\bar{t}) = s(\bar{t})H + w(\bar{t})$. The propagation delay between the transmitter and receiver is assumed to have been compensated for as part of a synchronization process.

(2) Delay-spread, time-invariant channel. Here, $H(\bar{t},\bar{t}-\bar{\tau}) = H(\bar{t}-\bar{\tau})$, implying that $x(\bar{t}) = \int d\bar{\tau} s(\bar{\tau}) H(\bar{t}-\bar{\tau}) + w(\bar{t})$. The convolution integral is equivalent to multiplication in the frequency domain, $\hat{x}(\bar{f}) = \hat{s}(\bar{f})\hat{H}(\bar{f}) + \hat{w}(\bar{f})$, where the hat symbol denotes the Fourier transform, and $\bar{f}$ is frequency in units of Hertz, e.g., $\hat{x}(\bar{f}) = \int d\bar{t} x(\bar{t}) e^{-i2\pi \bar{f}\bar{t}}$.

(3) Flat-fading, time-varying channel. Here, $H(\bar{t},\bar{t}-\bar{\tau}) = H(\bar{t})\delta(\bar{t}-\bar{\tau})$, implying that $x(\bar{t}) = s(\bar{t})H(\bar{t}) + w(\bar{t})$.

Typically, $H(\bar{t},\bar{t}-\bar{\tau})$ is much more slowly varying in $\bar{t}$ than in $\bar{t}-\bar{\tau}$. Consequently, over significant intervals of time, designated the "coherence interval," the channel is to a good approximation delay-spread and time-invariant. Some elementary considerations determine the duration of the coherence interval, and how rapidly the channel response changes with frequency.

A significant change in the impulse response requires that the position of the transmitter, the receiver, or scattering centers change by a fraction of a wavelength. The time required for this motion is called the coherence time. The well-known Jakes model, equivalent to a superposition of horizontally propagating planewaves, provides a quantitative criterion. Specifically, the propagation coefficients constitute a stationary random field with autocorrelation equal to $J_0(2\pi r/\lambda)$, where the wavelength is $\lambda = c/\bar{f}_0$, $c = 3 \cdot 10^8$ m/s, where $J_0$ is the zeroth-order Bessel function of the first kind, and $\bar{f}_0$ is the carrier frequency in Hertz. The autocorrelation is greater than 0.95 for $r/\lambda < 0.07$, and it is greater than 0.90 for $r/\lambda < 0.10$. For example, if the speed of the receiver is 30.0 m/s, and $\bar{f}_0 = 1.9 \cdot 10^9$, then the coherence interval over which the autocorrelation is greater than 0.95 is $$T_c = 0.07 c / \bar{f}_0 v = 0.37 \text{ milliseconds.} \qquad (2)$$

When an impulse is fed into a frequency-dependent channel, the output is a pulse that occupies a nonzero interval of time whose duration is called the "delay-spread." The delay-spread is directly related to the difference between the minimum and the maximum propagation path lengths between the transmitter and the receiver (the "range-spread"), $$\bar{T}_d = \frac{\Delta_R}{c} \qquad (3)$$

where $\bar{T}_d$ is the delay-spread (seconds) and $\Delta_R$ is the range-spread (meters). In turn, the frequency response of the channel is smooth over intervals of frequency that are proportional to the reciprocal of the delay-spread. If it is assumed that the channel impulse response is a white Gaussian random process, then the frequency response of the channel is a stationary random process with autocorrelation equal to $\text{sinc}(\pi \bar{f} \bar{T}_d)$ where sinc x=sin x/x. The autocorrelation is greater than 0.95 for $\bar{f}\bar{T}_d < 0.17$, and it is greater than 0.90 for $\bar{f}\bar{T}_d < 0.25$. For example, if the range-spread is 300 meters, then the delay spread is 1.0 microseconds, and the frequency coherence interval over which the autocorrelation is greater than 0.95 is $$\bar{F}_c = 0.17/\bar{T}_d = 170 \text{ kHz.} \qquad (4)$$

Over intervals of time that are less than the coherence time $T_c$, the channel behaves like a delay-spread, time-invariant system. In the technique of OFDM, a complex value baseband pulse is sent to each transmit antenna every $\bar{T}_s$ seconds, where $\bar{T}_s < T_c$. In turn, the pulse consists of a sum of harmonically related complex sinewaves, where every $\bar{T}_s$ seconds the transmitter can use different values for the complex amplitudes of the sinewaves.

The principle objective of OFDM is to ensure that the individual complex sine waves that comprise the pulse pass through the channel with negligible crosstalk. In this way, the channel is rendered into parallel subchannels. To that end, the OFDM signal interval $\bar{T}_s$, is divided into two distinct intervals that are characterized by an FFT integration time $\bar{T}$ (seconds) and a guard interval $\bar{T}_g$ (seconds) such that $\bar{T} + \bar{T}_g = \bar{T}_s$. The frequencies of the harmonically related complex sinewaves that comprise the pulse are chosen so that the sinewaves are mutually orthogonal over the FFT integration time $\bar{T}$. The guard interval is chosen to be greater than the delay-spread, $\bar{T}_g > \bar{T}_d$. The guard interval contains a periodic extension (the "cyclic prefix") of the signal that appears in the FFT integration interval.

Let B be the bandwidth of the transmitted signals (Hz). Then the signal in the FFT integration interval is completely characterized by $T = B \bar{T}$ complex-valued samples that are spaced $1/B$ seconds apart (the Nyquist interval). The cyclic prefix is characterized by a repetition of the last $T_g = B \bar{T}_g$ samples from the FFT integration interval. B, $\bar{T}$ and $\bar{T}_g$ are preferably chosen so that both T and $T_g$ are integers. It is also expedient for T to be a highly composite integer to ensure a fast FFT. Propagation of a finite-duration sinewave through the delay-spread channel is accompanied by a transient. The cyclic prefix ensures that there is an interval of time at least as great as the FFT integration time over which the received pulse is free of a transient. A discrete Fourier transform, when applied to the samples of the received signal over this transient-free interval, yields directly the complex amplitudes of the harmonically related sinewaves.

The Nyquist-sampled signals have a unique representation as an inverse discrete Fourier transform (DFT). Assume that the guard interval is $[-T_g, 0]$, and that the FFT integration interval is $[0, T]$. If $\{s_t, t=-T_g, \ldots, T-1\}$ denotes the sequence of 1×M vectors of samples of the transmitted signals, i.e., $$s_t = s(t/B), t=-T_g, \ldots, T-1. \qquad (5)$$

The discrete Fourier representation for these samples is $$s_t = \frac{1}{T} \sum_{f=0}^{T-1} \hat{s}_f e^{\frac{i2\pi ft}{T}}, t = -T_g, \ldots, T-1, \qquad (6)$$

where $\{s_t, t=-T_g, \ldots, t-1\}$ is the 1×M vector of the time-samples of the OFDM signals and $\{\hat{s}_f, f=0, \ldots, t-1\}$ is the 1×M vector of the frequency response of the OFDM signals.

The frequency samples can be recovered from the time samples by the discrete Fourier operation $$\hat{s}_f = \sum_{t=0}^{T-1} s_t e^{-i2\pi f \frac{t}{T}},$$

f=0, ..., T−1. During each OFDM symbol interval the MIMO transmitter encodes message bits onto the frequency samples of the OFDM signal, performs an inverse DFT to create the time-dependent OFDM signal, which in turn is fed into the M transmit antennas. The MIMO receiver applies a DFT to the time-dependent received signals from its N receive antennas to create equivalent frequency samples, which are then decoded. The overall action of the OFDM modulation, transmission, reception, and OFDM demodulation can be viewed in the frequency domain. In effect, at each of the T discrete frequencies f, the MIMO transmitter transmits a 1×M complex vector $\hat{s}_f$, and the MIMO receiver receives a 1×N complex vector $\hat{x}_f$, where $\hat{x}_f = \hat{s}_f H_f + w_f$, f=0, ..., T−1 is the 1×N vector of receiver noise at each discrete frequency, and $H_f$ is the M×N channel frequency response for each discrete frequency. The invention introduces a novel way to deal with the fact that neither the transmitter nor the receiver knows the channel frequency response. The invention uses the fact that the channel frequency response is approximately constant over intervals that correspond to the frequency coherence interval of the channel, specifically over an interval of frequency samples that is equal to the product of the frequency coherence interval $F_c$ (Hertz) and the FFT integration time $T$ (seconds).

Figure 2:
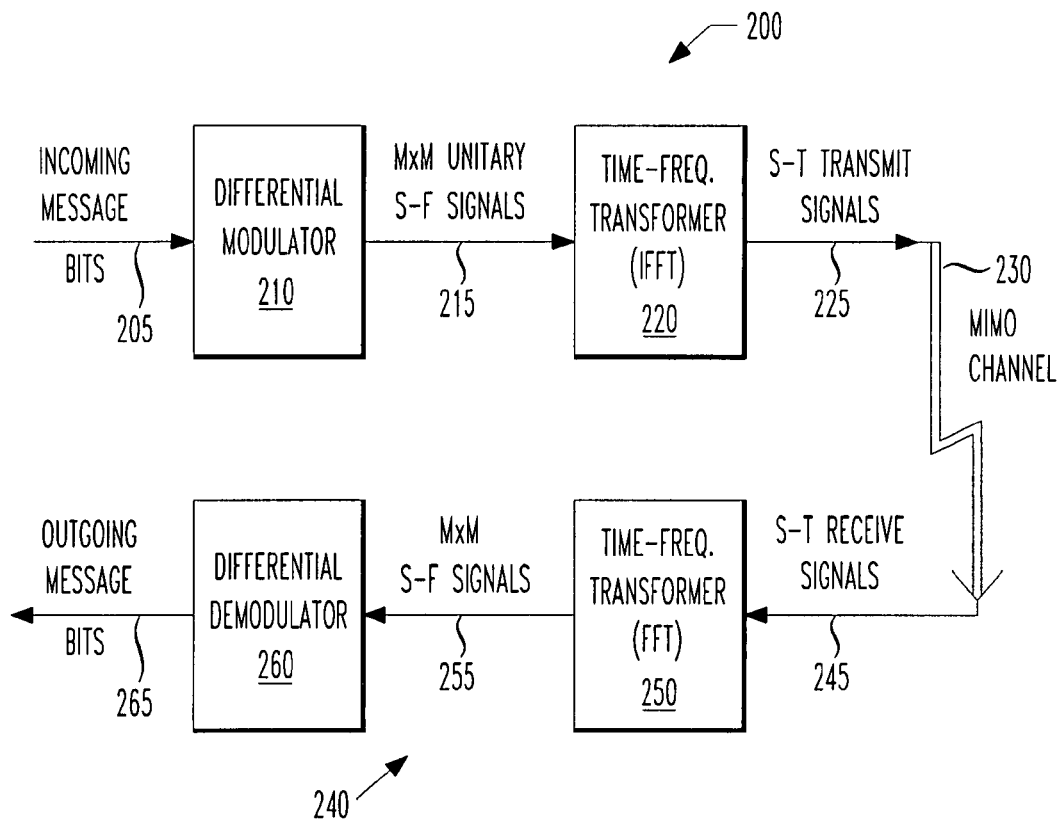
FIG. 2 illustrates a block diagram of frequency-division multiplexing and demultiplexing systems for use with M transmit antennas and N receive antennas constructed in accordance with the principles of the present invention.

Turning now to FIG. 2, illustrated is a block diagram of a frequency-division multiplexing and demultiplexing system 200 constructed in accordance with the principles of the present invention.

The frequency-division multiplexing system 200 includes a differential modulator 210. The differential modulator 210 generates a sequence of M×M unitary space-frequency signals 215 of total duration T samples. In the illustrated embodiment, the differential modulator 210 is a differential OFDM modulator and, more specifically, a differential Cayley modulator.

The frequency-division multiplexing system 200 further includes a time-frequency transformer 220. The time-frequency transformer 220 is coupled to the differential modulator 210 and transforms the M×M unitary space-frequency signals 215 into space-time transmit signals 225 for the M transmit antennas (not shown in FIG. 2, but shown in FIG. 1 as the transmit array of M antennas 120). In the illustrated embodiment, the time-frequency transformer 220 applies an Inverse Fast Fourier Transform (IFFT) to the sequence of M×M unitary space-frequency signals 215 to transform them into the space-time transmit signals 225. Furthermore, in the illustrated embodiment, the space-time transmit signals 225 include a guard interval. Those skilled in the art understand the role of a guard interval in OFDM transmission. The space-time transmit signals 225 are then passed to a MIMO channel 230 via an array of M transmit antennas (not shown). FIG. 2 does not include certain practical details that are well-known to those familiar with OFDM, including (at the transmit end) adding the cyclic extension and filtering, and (at the receive end) filtering, sampling, synchronization, and removing the cyclic extension.

During their transit through the MIMO channel 230, the space-time transmit signals 225 are subjected to frequency-dependent channel gains, interference and noise and are transformed over time according to Equation 1 above. For purposes of describing FIG. 2, the space-time transmit signals 225 are transformed into space-time receive signals 245. Accordingly, on the receive side, an array of N receive antennas (not shown) receives the space-time receive signals 245 from the MIMO channel 230.

The frequency-division demultiplexing system 240 includes a time-frequency transformer 250. The time-frequency transformer 250 (which, in the illustrated embodiment, performs an operation inverse to that of the time-frequency transformer 220) transforms the sequence of space-time receive signals 245 from the N receive antennas into M×N space-frequency signals 255. In the illustrated embodiment, the time-frequency transformer 250 applies an FFT to the space-time receive signals 245.

The frequency-division demultiplexing system 240 further includes a differential demodulator 260. The differential demodulator 260 generates outgoing message bits 265 from the M×N space-frequency signals 255. In the illustrated embodiment, the differential demodulator 260 is a differential OFDM demodulator and, more specifically, a differential Cayley demodulator.

The fidelity of the outgoing message bits 265 with respect to the incoming message bits 205 is preserved, even in fading environments, by virtue of the cooperation among the differential modulator 210, the time-frequency transformer 220, the time-frequency transformer 250 and the differential demodulator 260.

Figure 3:
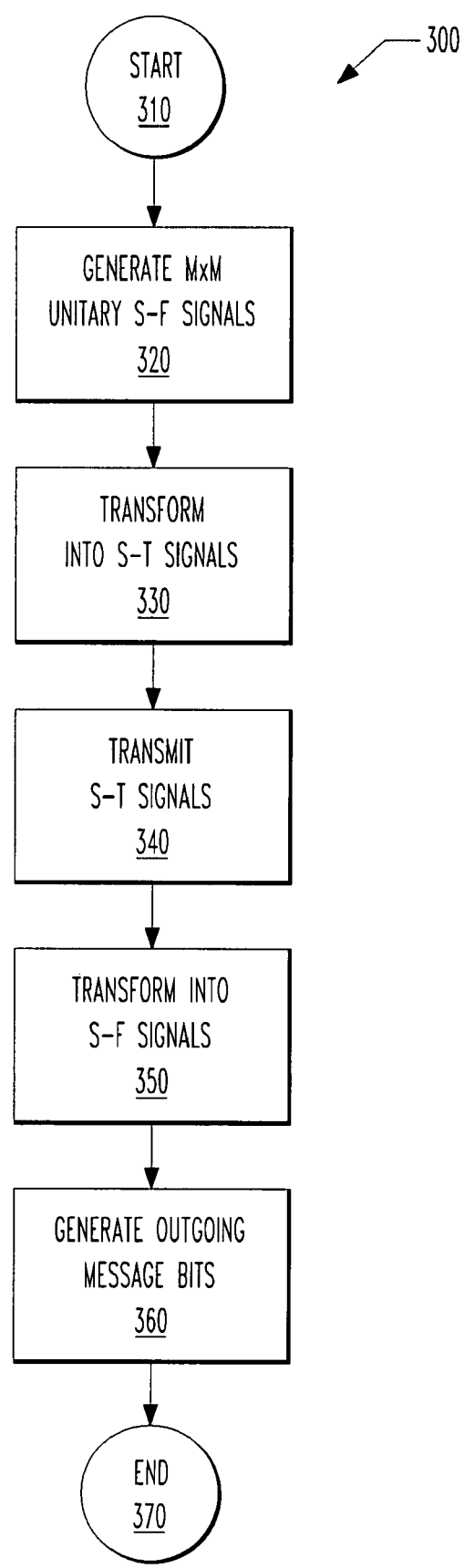
FIG. 3 illustrates a flow diagram of frequency-division multiplexing and demultiplexing methods carried out in accordance with the principles of the present invention.

Turning now to FIG. 3, illustrated is a flow diagram of frequency-division multiplexing and demultiplexing methods (expressed in a single method 300) carried out in accordance with the principles of the present invention.

The method begins in a start step 310, wherein it is desired to transmit message bits (termed "incoming message bits") wirelessly to a remote receiver. The method 300 proceeds to a step 320, wherein M×M unitary space-frequency signals are generated from the incoming message bits. Next, in a step 330, the M×M unitary space-frequency signals are transformed into space-time transmit signals for M transmit antennas. In the illustrated embodiment, an IFFT is applied to the M×M unitary space-frequency signals. The space-time transmit signals are then transmitted from the M transmit antennas to N receive antennas via a MIMO channel in a step 340, by which process they are transformed into space-time receive signals.

Next, in a step 350, the space-time receive signals are transformed into M×N space-frequency signals. In the illustrated embodiment, an FFT is applied to the space-time receive signals. Then, in a step 360, outgoing message bits are generated from the M×N space-frequency signals. Having successfully communicated the message bits, the method 300 ends in an end step 370.

The above-described method is preferably carried out within a single OFDM symbol interval of duration $T_s$ seconds, and the method can advantageously be applied independently in each OFDM symbol interval. Alternatively, one can exploit the fact that the channel frequency response typically is highly correlated between successive OFDM symbols. The first frequency sample of the initial OFDM symbol is the M×M identity matrix which is not modulated by the message bits, and so constitutes some overhead. In the next OFDM symbol, the first frequency sample can be an M×M message-bearing unitary matrix, which can be decoded at the receiver by differential decoding between the first received frequency samples from the two OFDM symbol intervals.

Although the present invention has been described in detail, those skilled in the art should understand that they can make various changes, substitutions and alterations herein without departing from the spirit and scope of the invention in its broadest form.

What is claimed is:

1. A frequency-division multiplexing system for use with M greater than or equal to two transmit antennas and N greater than or equal to two receive antennas, comprising:
   (a) a mapper modulator configured to map each of a plurality of incoming sets of message bits to a current M×M unitary symbol matrix;
   (b) a differential modulator configured to generate, in a sequence of repetitions, a sequence of consecutive differential M×M unitary space-frequency signal matrices by performing in each new repetition a differential action between said differential M×M unitary space-frequency signal matrix resulting from a last repetition and said current M×M unitary symbol matrix, thereby to generate a new differential M×M unitary space-frequency signal matrix,
   wherein said differential action is carried out such that said message bits mapped to said current M×M unitary symbol matrix are encoded as a differential between two consecutive differential M×M unitary space-frequency signal matrices,
   wherein said differential is substantially invariant to frequency-response conditions in a propagation channel between said transmit and receive antennas; and
   (c) a time-frequency transformer configured to accept each differential M×M unitary space-frequency signal matrix as a signal distributed over antennas and frequency sub-channels such that consecutive differential M×M unitary space-frequency signal matrices are distributed over consecutive frequency sub-channels, and
   further configured to transform each differential M×M unitary space-frequency signal matrix to a corresponding space-time transmit signal distributed over two or more antennas and time for transmission over a given time window.

2. The system as recited in claim 1 wherein said differential modulator is a differential OFDM modulator.

3. The system as recited in claim 1 wherein said mapper modulator comprises a Cayley mapper modulator.

4. The system as recited in claim 1 wherein said time-frequency transformer applies an Inverse Fast Fourier Transform to said differential M×M unitary space-frequency signal matrices.

5. The system as recited in claim 1 wherein said space-time transmit signals include a guard interval.

6. The system as recited in claim 1 wherein said differential modulator is configured to generate a transformation of said differential M×M unitary space-frequency signal matrix within a single OFDM symbol interval.

7. A frequency-division multiplexing method for use with M greater than or equal to two transmit antennas and N greater than or equal to two receive antennas, comprising:
   mapping each of a plurality of incoming sets of message bits to a current M×M unitary symbol matrix;
   generating, in a sequence of repetitions, a sequence of differential M×M unitary space-frequency signal matrices by performing in each new repetition a differential action between said differential M×M unitary space-frequency signal matrix resulting from a last said repetition and said current M×M unitary symbol matrix, thereby to generate a new differential M×M space-frequency signal matrix;
   wherein said differential action is carried out such that said message bits mapped to said current M×M symbol matrix are encoded as a differential between two consecutive differential M×M unitary space-frequency signal matrices,
   wherein said differential is substantially invariant to frequency-response conditions in a propagation channel between said transmit and receive antennas,
   providing each differential M×M unitary space-frequency signal matrix as a signal distributed over antennas and frequency sub-channels such that consecutive differential M×M unitary space-frequency signal matrices are distributed over consecutive frequency sub-channels; and
   transforming each differential M×M unitary space-frequency signal matrix to a corresponding space-time transmit signal distributed over antennas and time for transmission over a given time window.

8. The method as recited in claim 7 wherein said generating is carried out by a differential OFDM modulator.

9. The method as recited in claim 7 wherein said mapping is carried out by a Cayley mapper modulator.

10. The method as recited in claim 7 wherein said transforming of signal matrices to space-time transmit signals comprises applying an Inverse Fast Fourier Transform to said differential M×M unitary space-frequency signal matrices.

11. The method as recited in claim 7 wherein said space-time transmit signals include a guard interval.

12. The method as recited in claim 7 wherein said method is carried out so as to provide and transform each differential M×M unitary space-frequency signal matrix within a single OFDM symbol interval.

13. A frequency-division demultiplexing system for use with M greater than or equal to two transmit antennas and N greater than or equal to two receive antennas, comprising:
   (a) a time-frequency transformer that transforms space-time receive signals from said N receive antennas into differential M×M unitary space-frequency signal matrices, wherein each said space-frequency signal is distributed over antennas and frequency sub-channels such that consecutive differential M×M unitary signal matrices are distributed over consecutive frequency sub-channels;
   (b) a differential demodulator operative to generate from an input sequence of differential M×M unitary space-frequency signal matrices, in a sequence of repetitions, a sequence of consecutive M×M unitary symbol matrices, by performing in each new repetition a differential demodulation between a prior received differential M×M unitary signal matrix and a current received differential M×M unitary signal matrix, thereby recovering a current M×M unitary symbol matrix, wherein the recovery of said current M×M unitary symbol matrix is substantially invariant to frequency-response conditions in a propagation channel between said transmit and receive antennas; and
   (c) a mapper demodulator configured to map each said current M×M unitary symbol matrix to an outgoing set of message bits.

14. The system as recited in claim 13 wherein said differential demodulator is a differential OFDM demodulator.

15. The system as recited in claim 13 wherein said mapper demodulator comprises an inverse Cayley mapper.

16. The system as recited in claim 13 wherein said time-frequency transformer applies a Fast Fourier Transform to said space-time receive signals.

17. The system as recited in claim 13 wherein said space-time receive signals include a guard interval.

18. The system as recited in claim 13 wherein each said M×M unitary space-frequency symbol matrix is recovered within a single OFDM symbol interval.

19. A frequency-division demultiplexing method for use with M greater than or equal to two transmit antennas and N greater than or equal to two receive antennas, comprising:

transforming space-time receive signals from said N receive antennas into differential M×M unitary space-frequency signal matrices, wherein each said differential M×M space-frequency signal matrix signal is distributed over antennas and frequency sub-channels such that consecutive differential M×M unitary signal matrices are distributed over consecutive frequency sub-channels;

generating, from a differential demodulation of an input sequence of differential M×M unitary space-frequency signal matrices, in a sequence of repetitions, a sequence of consecutive M×M unitary symbol matrices, by performing in each new repetition a differential demodulation between a prior received differential M×M unitary signal matrix and a current received differential M×M unitary signal matrix, thereby recovering an M×M unitary symbol matrix, wherein the recovery of received M×M unitary symbol matrices is substantially invariant to frequency-response conditions in a propagation channel between said transmit and receive antennas; and demodulating each said current M×M unitary symbol matrix to a set of message bits.

20. The method as recited in claim 19 wherein said transforming is carried out by a differential OFDM demodulator.

21. The method as recited in claim 19 wherein said demodulating is carried out by an inverse Cayley mapper demodulator.

22. The method as recited in claim 19 wherein said transforming comprises applying a Fast Fourier Transform to said space-time receive signals.

23. The method as recited in claim 19 wherein said space-time receive signals include a guard interval.

24. The method as recited in claim 19 wherein the recovery of each symbol matrix is carried out within a single OFDM symbol interval.

\* \* \* \* \*